United States Patent
Ota

(10) Patent No.: US 8,223,233 B2
(45) Date of Patent: *Jul. 17, 2012

(54) IMAGING DEVICE AND METHOD OF DRIVING SOLID STATE IMAGING ELEMENT

(75) Inventor: Motoari Ota, Kanagawa (JP)

(73) Assignee: Fujifilm Corporation (JP)

( * ) Notice: Subject to any disclaimer, the term of this patent is extended or adjusted under 35 U.S.C. 154(b) by 396 days.

This patent is subject to a terminal disclaimer.

(21) Appl. No.: 12/497,012

(22) Filed: Jul. 2, 2009

(65) Prior Publication Data

US 2010/0002110 A1    Jan. 7, 2010

(30) Foreign Application Priority Data

Jul. 3, 2008    (JP) ................................. 2008-174319

(51) Int. Cl.
*H04N 3/14*    (2006.01)
(52) U.S. Cl. .......................... 348/294; 348/297; 348/308
(58) Field of Classification Search .................. 348/294, 348/308, 297
See application file for complete search history.

(56) References Cited

U.S. PATENT DOCUMENTS

| 6,510,193 | B1 | 1/2003 | Kochi et al. | |
| 6,631,022 | B1 * | 10/2003 | Kihira et al. | 359/265 |
| 7,515,187 | B2 * | 4/2009 | Suzuki | 348/296 |
| 7,652,705 | B2 * | 1/2010 | Suzuki | 348/308 |
| 8,049,800 | B2 * | 11/2011 | Ota | 348/294 |
| 2005/0205901 | A1 | 9/2005 | Suzuki | |
| 2005/0206766 | A1 | 9/2005 | Suzuki | |
| 2006/0092299 | A1 | 5/2006 | Suzuki | |
| 2006/0285000 | A1 * | 12/2006 | Mabuchi | 348/308 |
| 2007/0278537 | A1 * | 12/2007 | Haraguchi | 257/239 |

FOREIGN PATENT DOCUMENTS

| JP | H3-167973 A | 7/1991 |
| JP | H9-129864 A | 5/1997 |
| JP | H9-252434 A | 9/1997 |
| JP | H11-27582 A | 1/1999 |
| JP | 2005-268477 A | 9/2005 |
| JP | 2005-268479 A | 9/2005 |
| JP | 2006-120921 A | 5/2008 |
| JP | 2008-103647 A | 5/2008 |

OTHER PUBLICATIONS

Japanese Office Action "Notification of Reasons for Refusal" dated May 15, 2012; Japanese Patent Application No. 2008-174319 with translation.

* cited by examiner

*Primary Examiner* — Tuan Ho
*Assistant Examiner* — Shahbaz Nazrul
(74) *Attorney, Agent, or Firm* — Studebaker & Brackett PC; Donald R. Studebaker

(57) ABSTRACT

An imaging device includes a solid state imaging element that includes a plurality of pixels; and a driving unit; wherein each pixel includes: a photoelectric converting element includes a pair of electrodes stacked above a semiconductor substrate and a photoelectric converting layer arranged between the electrodes; a connecting portion that is arranged in the semiconductor substrate; a potential barrier portion; a first charge accumulating portion; and a signal output circuit, and wherein the driving unit drives the solid state imaging element so that the connecting portion and the potential barrier portion are set to a same potential by injecting charges into the connecting portion.

16 Claims, 11 Drawing Sheets

US 8,223,233 B2

IMAGING DEVICE AND METHOD OF DRIVING SOLID STATE IMAGING ELEMENT

The present application claims priority from Japanese Patent Application No. 2008-174319 filed on Jul. 3, 2008, the entire content of which is incorporated herein by reference.

BACKGROUND OF INVENTION

1. Field of the Invention

The present invention relates to an imaging device that is equipped with a solid state imaging element containing a plurality of pixels that have a photoelectric converting element, which has a pair of electrodes stacked over a semiconductor substrate and a photoelectric converting layer put between the electrodes, respectively.

2. Description of the Related Art

In JP-A-2005-268477, the solid state imaging element equipped with a semiconductor substrate on a signal reading circuit composed of MOS transistor circuits is formed, a photoelectric converting film stacked on the semiconductor substrate to generate charges in response to a quantity of incident light, a connecting portion which is provided on a surface of the semiconductor substrate and to which a wiring for guiding the charges to the surface of the semiconductor substrate is connected, a potential barrier unit provided in vicinity of the connecting portion and acting as a predetermined potential barrier against the charges, and a charge accumulating portion provided in vicinity of the potential barrier unit and connected to a gate of an output transistor constituting the signal reading circuit is disclosed.

According to this structure, the charges generated by a photoelectric converting film can be flown smoothly to the gate of the output transistor. Therefore, an effective electrostatic capacity of a portion in which the charges are accumulated can be decreased when viewed from the gate of the output transistor, a signal voltage can be increased and thus an output signal of high sensitivity can be obtained.

FIG. 10 is a view explaining an operation of the solid state imaging element disclosed in JP-A-2005-268477, and is a view showing a sectional potential in the semiconductor substrate.

In order to acquire a signal from one pixel of the solid state imaging element, first the charges accumulated in the charge accumulating portion are discharged to the reset drain and the reset operation is executed (time T0). At this time, as shown in FIG. 10, a reset noise N1 as noise charges generated due to the reset operation is accumulated in the charge accumulating portion. After the reset is completed, the exposure of the photoelectric converting film is started, and then the charges Q generated by this exposure are accumulated in the charge accumulating portion from the connecting portion through a potential barrier (time T1). Then, a signal responding to a quantity of charge accumulated in the charge accumulating portion during this exposure period is output from the signal reading circuit. After this signal output, the reset operation is executed again at a time T2, and a reset noise N2 is accumulated in the charge accumulating portion. Then, the next exposure is started in this state.

In the signal processing circuit for processing the signal output from the solid state imaging element, the correlated double sampling (CDS) circuit for applying a correlated double sampling process to the signal is contained. In this CDS circuit, sampling of both a signal responding to the reset noise and a signal responding to the charges in which the reset noise is contained are executed, and then the reset noise is removed by calculating a difference between both signals.

The reset noise can be removed completely by subtracting the signal responding to the reset noise N1 acquired at a time T0 from the imaging signal acquired at a time T1. In order to make such process, in the CDS circuit, the signal being output from the solid state imaging element must be sampled at a time T0 (sampling SP1), then the signal being output from the solid state imaging element must be sampled at a time T1 (sampling SP2), and then a difference between both resultant signals must be calculated. In this case, a time period from the sampling SP1 to the sampling SP2 is equal to an exposure period, and the CDS circuit has to process sequentially the signals from all pixels. Therefore, if the samplings of signals are executed at such time interval, the process cannot catch up with the signals that are being output from the solid state imaging element sequentially.

For this reason, in the prior art, removal of the reset noise (a part of reset noise can be removed, although such noise cannot be perfectly removed) is executed by subtracting the signal that is sampled at a time T2 (sampling SP3) from the signal that is sampled at a time T1. Since a time interval between the sampling SP2 and the sampling SP3 is sufficiently short in contrast to the exposure period, the CDS process can be applied to the signals from all pixels without any trouble.

The charges that decide a potential of the connecting portion always flow out from the connecting portion to the charge accumulating portion due to thermal diffusion. In the meanwhile, members such as wirings, photoelectric converting film, and the like are connected to the connecting portion. Thus, the charges generated in the photoelectric converting film flow into the connecting portion via the members, and the charges generated in a joined portion between the connecting portion and the substrate flow into the connecting portion. Therefore, an outflow of the charges from the connecting portion due to the thermal diffusion stops apparently when a quantity of charges per unit time that flow out from the connecting portion due to the thermal diffusion becomes equal to a quantity of charges per unit time that flow into the connecting portion via the wiring, etc. (this moment is called an equilibrium state).

A total quantity $\Delta Q$ of charges that are diffused from the connecting portion to peripheral areas due to thermal excitation until a time t (<time teq at which the charges reach an equilibrium state) is given by following Expression (1).

$$\Delta Q \propto \ln(1+\alpha t) \quad (1)$$

Where $\alpha$ is a proportionality factor.

As shown at a time T0 in FIG. 10, such a situation is ideal that, as the result of this equilibrium state, the potential barrier and the connecting portion are set to the same potential. The pixels that are in the ideal equilibrium state exist, and also the pixels in which a potential of the connecting portion is higher than a potential of the potential barrier in the equilibrium state exist. FIG. 11 shows the potential of such pixel. As shown in FIG. 11, the charges that decide a potential of the connecting portion is decreased by $\Delta Q$, and a potential of the connecting portion becomes higher than a potential of the potential barrier.

When the exposure is started in a state shown in FIG. 11, a part of the charges Q generated by the photoelectric converting film remains in the connecting portion. Therefore, a quantity of charges that move to the charge accumulating portion, i.e., a quantity of signals that are read out to the outside, is decreased by $\Delta Q$, which causes a lag.

Further, the signal output characteristic with respect to a quantity of incident light depends on a potential of the connecting portion, i.e., a depth of a potential well of the connecting portion, a depth of the potential well depends on an amount of thermal diffusion of charges in the connecting portion, an amount of thermal diffusion depends on a quantity of current that flows into the connecting portion, a quantity of current that flows into the connecting portion depends on a quantity of current that flows into the connecting portion from the photoelectric converting film, and a depth of the potential well is varied along with the time. As a result, a signal output is not decided uniquely in response to a quantity of incident light, and thus it is impossible to execute a linearity correction simply based on the correction information that are held in advance.

SUMMARY OF INVENTION

The present invention has been made in view of the above circumstances, and it is intended to prevent a lag and also allow a linearity correction by preventing such a situation that charges remain in a connecting portion between a photoelectric converting element and a semiconductor substrate, in an imaging device that is equipped with a solid state imaging element containing the photoelectric converting element provided over the semiconductor substrate.

(1) An imaging device, includes: a solid state imaging element that has a plurality of pixels including: a semiconductor substrate; a pair of electrodes stacked above the semiconductor substrate; and a photoelectric converting layer arranged between the pair of electrodes; and a driving unit that drives the solid state imaging element; wherein each pixel further includes: a connecting portion that is arranged in the semiconductor substrate and that is connected electrically to one of the pair of electrodes; a potential barrier portion that is arranged adjacent to the connecting portion in the semiconductor substrate and that acts as a potential barrier against a potential of the connecting portion; a first charge accumulating portion that is arranged adjacent to the potential barrier portion in the semiconductor substrate and in which charges generated in the photoelectric converting layer are accumulated via the connecting portion and the potential barrier portion; and a signal output circuit that outputs a signal in response to the charges accumulated in the first charge accumulating portion, and wherein the driving unit drives the solid state imaging element so that the connecting portion and the potential barrier portion are set to a same potential by injecting charges into the connecting portion.

According to this configuration, the exposure can be carried out in a state that the connecting portion and the potential barrier portion are set to the same potential respectively. Therefore, such a situation can be prevented that a part of the charges produced in the photoelectric converting layer during the exposure remain in the connecting portion, and occurrence of the lag can be prevented. Also, since the potential of the connecting portion (which becomes equal to the potential of the potential barrier portion) in starting the exposure can be known, a reference level of the output signal can be set. As a result, the linearity correction of the signal output characteristic with respect to a quantity of incident light can be applied, and the signal output characteristic can be set linearly.

(2) In the imaging device according to (1), the signal output circuit includes a reset transistor, and wherein, for applying the same potential between connecting portion and the potential barrier portion, the driving unit injects charges into the connecting portion by decreasing a potential of a drain of the reset transistor lower or increasing the potential of the drain of the reset transistor higher than a potential of the potential barrier portion, to restore the potential of the drain to a potential, and to discharge unnecessary charges generated by restoring to the drain.

According to this configuration, the connecting portion and the potential barrier portion can be set to the same potential only by controlling the reset voltage without addition of the special element.

(3) The imaging device according to (1) further includes a charge injection transistor having the connecting portion as a drain for injecting the charges to the connecting portion, wherein the signal output circuit includes a reset transistor, and wherein, for applying the same potential between connecting portion and the potential barrier portion, the driving unit injects charges into the connecting portion from the source by decreasing a potential of a source of the charge injection transistor lower or increasing the potential of the source of the charge injection transistor higher than a potential of a gate of the charge injection transistor, to restore the potential of the source to a potential after injection of the charges, and to discharge unnecessary charges generated by the injection to the drain of the reset transistor.

According to this configuration, a change of potential can be reduced in contrast to the case where the charges are injected by controlling the potential of the reset drain. Therefore, a reduction in the power consumption can be achieved.

(4) The imaging device according to (1) further includes a charge injection transistor having the connecting portion as a drain for injecting the charges to the connecting portion, and wherein the signal output circuit includes a reset transistor, and wherein, for applying the same potential between connecting portion and the potential barrier portion, the driving unit injects charges into the connecting portion from the source by decreasing a potential of a gate of the charge injection transistor lower or increasing the potential of the gate of the charge injection transistor higher than a potential of a source of the charge injection transistor, to restore the potential of the gate to a potential after injection of the charges, and to discharge unnecessary charges generated by the injection to the drain of the reset transistor.

According to this configuration, a change of potential can be reduced in contrast to the case where the charges are injected by controlling the potential of the reset drain. Therefore, a reduction in the power consumption can be achieved.

(5) In the imaging device according to (2), the driving unit applies starts an exposure of the solid state imaging element in a state that the connecting portion and the potential barrier portion are set to the same potential, to decrease or increase a potential of the potential barrier portion lower or higher than a potential during the exposure as soon as the exposure is ended, and to restore the potential of the potential barrier portion to the potential during the exposure until the unnecessary charges are discharged in a driving after a signal obtained by the exposure is output.

(6) The imaging device according to (1) further includes a second charge accumulating portion that is arranged in the semiconductor substrate and that is connected to a gate of an output transistor constituting the signal output circuit, and a charge transferring unit that transfers the charges accumulated in the first charge accumulating portion to the second charge accumulating portion.

(7) In the imaging device according to (6), the first charge accumulating portion is formed of an embedded type accumulating portion.

(8) In the imaging device according to (1), the photoelectric converting layer is formed of an organic material.

(9) A method of driving a solid state imaging element that has a plurality of pixels including: a semiconductor substrate; a pair of electrodes stacked above the semiconductor substrate; a photoelectric converting layer arranged between the pair of electrodes; a connecting portion that is arranged in the semiconductor substrate and that is connected electrically to one of the pair of electrodes; a potential barrier portion that is arranged adjacent to the connecting portion in the semiconductor substrate and that acts as a potential barrier against a potential of the connecting portion; a first charge accumulating portion that is arranged adjacent to the potential barrier portion in the semiconductor substrate and in which charges generated in the photoelectric converting layer are accumulated via the connecting portion and the potential barrier portion; and a signal output circuit that outputs a signal in response to the charges accumulated in the first charge accumulating portion, the method includes; driving the solid state imaging element so that the connecting portion and the potential barrier portion are set to a same potential by injecting charges into the connecting portion.

(10) The method of driving the solid state imaging element according to (9) further includes: for applying the same potential between connecting portion and the potential barrier portion, injecting charges into the connecting portion by decreasing a potential of a drain of a reset transistor in the signal output circuit lower or increasing the potential of the drain of the reset transistor in the signal output circuit higher than a potential of the potential barrier portion, restoring the potential of the drain to a potential; and discharging unnecessary charges generated by restoring to the drain.

(11) The method of driving the solid state imaging element according to (9) further includes a charge injection transistor having the connecting portion as a drain for injecting the charges to the connecting portion, the method further includes: for applying the same potential between connecting portion and the potential barrier portion, injecting charges into the connecting portion from the source by decreasing a potential of a source of the charge injection transistor lower or increasing a potential of the source of the charge injection transistor higher than a potential of a gate of the charge injection transistor, restoring the potential of the source to a potential after injection of the charges; and discharging unnecessary charges generated by the injection to the drain of a reset transistor in the signal output circuit.

(12) The method of driving the solid state imaging element according to (9) includes a charge injection transistor having the connecting portion as a drain for injecting the charges to the connecting portion, the method further includes: for applying the same potential between connecting portion and the potential barrier portion, injecting charges into the connecting portion from the source by decreasing a potential of a gate of the charge injection transistor lower or increasing the potential of the gate of the charge injection transistor higher than a potential of a source of the charge injection transistor, restoring the potential of the gate to a potential after injection of the charges; and discharging unnecessary charges generated by the injection to the drain of the reset transistor in the signal output circuit.

(13) The method of driving the solid state imaging element according to (10) further includes: starting an exposure of the solid state imaging element in a state that the connecting portion and the potential barrier portion are set to the same potential; decreasing a potential of the potential barrier portion lower or increasing the potential of the potential barrier portion lower higher than a potential during the exposure as soon as the exposure is ended; and restoring the potential of the potential barrier portion to the potential during the exposure until the unnecessary charges are discharged in the driving after a signal obtained by the exposure is output.

(14) The method of driving the solid state imaging element according to (9) further includes a second charge accumulating portion that is arranged in the semiconductor substrate and that is connected to a gate of an output transistor constituting the signal output circuit, and a charge transferring unit that transfers the charges accumulated in the first charge accumulating portion to the second charge accumulating portion.

(15) In the method of driving the solid state imaging element according to (9), the first charge accumulating portion is formed of an embedded type accumulating portion.

(16) In the method of driving the solid state imaging element according to (9), the photoelectric converting layer is formed of an organic material.

According to the present invention, it is possible to prevent the lag and also allow the linearity correction by preventing such a situation that the charges remain in the connecting portion between the photoelectric converting element and the semiconductor substrate, in an imaging device that is equipped with the solid state imaging element containing the photoelectric converting element provided over the semiconductor substrate.

DESCRIPTION OF EXEMPLARY EMBODIMENTS

Embodiments of the present invention will be explained with reference to the drawings hereinafter.

(First Embodiment)

Figure 1:
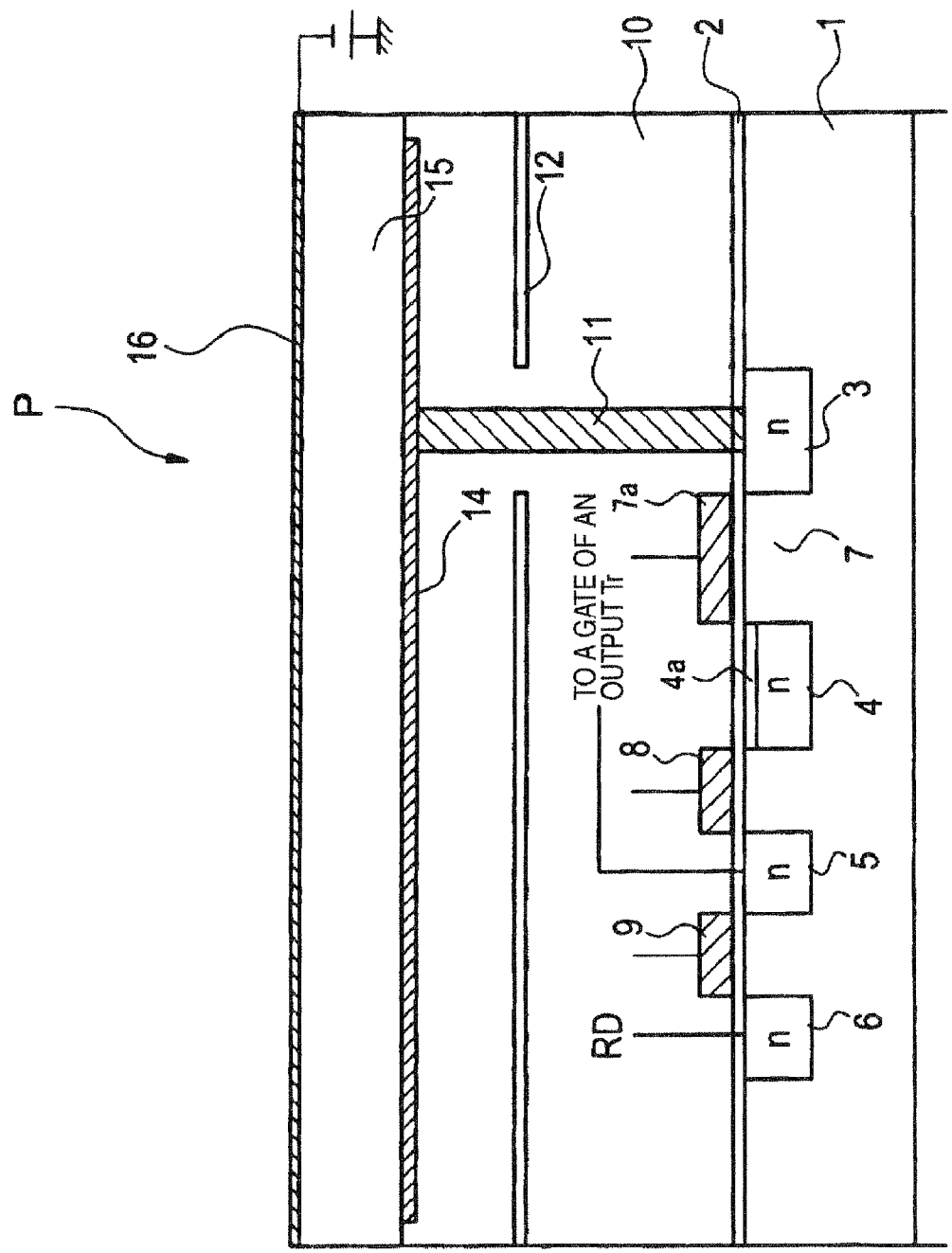
FIG. 1 is a schematic sectional view showing one pixel of a solid state imaging element as a first embodiment of the present invention.

FIG. 1 is a schematic sectional view showing one pixel of a solid state imaging element as a first embodiment of the present invention. The solid state imaging element is constructed by arranging one pixel shown in FIG. 1 in plural on the same plane one-dimensionally or two-dimensionally. While taking as an example such a configuration that one pixel shown in FIG. 1 is aligned two-dimensionally in the row (horizontal) direction and the column (vertical) direction perpendicular to the row (horizontal) direction, explanation will be made hereunder.

The solid state imaging element shown in FIG. 1 contains a p-type silicon substrate 1 as a semiconductor substrate (referred to as a "substrate 1" hereinafter), and a photoelectric converting element P stacked over the substrate 1 via a gate insulating film 2 and an insulating layer 10.

The photoelectric converting element P is constructed to includes a lower electrode 14 formed on the insulating layer 10, a photoelectric converting layer 15 formed on the lower electrode 14, and an upper electrode 16 formed on the photoelectric converting layer 15.

An incident light from a subject located on the upper side is incident onto the upper electrode 16. Since the upper electrode 16 inputs the incident light into the photoelectric converting layer 15, such upper electrode 16 is formed of a conductive material such as ITO, which is transparent to the incident light. A sheet of the upper electrode 16 is used commonly to all pixels, but the upper electrode 16 may be divided every pixel.

The lower electrode 14 is formed of a thin film that is divided every pixel, and is formed of a transparent or opaque conductive material (ITO, aluminum, or the like).

The photoelectric converting layer 15 is formed of an organic or inorganic photoelectric converting material that absorbs a light in a particular wavelength range out of the incident light, and produces the charges in response to a quantity of absorbed light. When the photoelectric converting layer 15 is formed of the photoelectric converting material (e.g., quinacridone) that absorbs a light in an infrared wavelength range out of the incident light and produces the charges in response to this light, the monochromatic image under the visible rays can be picked up. When the photoelectric converting layer 15 is formed of the photoelectric converting material (e.g., phthalocyanine-based organic material or naphthalocyanine-based organic material) that absorbs a light in an infrared wavelength range and produces the charges in response to this light, the monochromatic image under the infrared rays can be picked up.

A connecting portion 3 formed of an n-type impurity layer and connected electrically to the lower electrode 14 is provided in the substrate 1. The connecting portion 3 and the lower electrode 14 are connected by a contact wiring 11 that is formed of the conductive material and embedded in the gate insulating film 2 and the insulating layer 10.

A p-type potential barrier portion 7 of opposite conductive type to the connecting portion 3 is provided adjacent to the connecting portion 3. The potential barrier portion 7 functions as a potential barrier unit that acts as the potential barrier against the connecting portion 3.

A first charge accumulating portion 4 for accumulating the charges, which reach the connecting portion 3 from the contact wiring 11 and move through the potential barrier portion 7, is provided adjacent to the potential barrier portion 7. The first charge accumulating portion 4 is formed of an n-type impurity layer that is the same conductivity type as the connecting portion 3.

A p-type impurity layer 4a formed by implanting a p-type impurity of opposite conductivity type to the first charge accumulating portion 4 is formed on a surface of the first charge accumulating portion 4. Because the p-type impurity layer 4a is formed on the surface of the first charge accumulating portion 4, the first charge accumulating portion 4 is formed not on the outermost surface of the substrate but in the substrate as a "so-called embedded type", so that the charges are accumulated in the substrate. As a result, mixture of a dark current generated on the surface of the substrate can be suppressed, and also a S/N ratio can be improved. Also, when the first charge accumulating portion 4 is formed as the perfect depletion layer by adjusting an impurity concentration of the first charge accumulating portion 4 and the p-type impurity layer 4a, the so-called perfect transfer can be achieved.

A gate electrode 7a of a transistor, which has the connecting portion 3 as a source and the first charge accumulating portion 4 as a drain, is provided over the potential barrier portion 7 via the gate insulating film 2. The gate electrode 7a is referred to as a barrier gate hereinafter.

A second charge accumulating portion 5 is provided adjacent to the first charge accumulating portion 4 at a short distance from there. The second charge accumulating portion 5 is formed of an n-type impurity layer of the same conductivity type as the connecting portion 3.

A gate electrode 8 of a transistor, which has the first charge accumulating portion 4 as a source and the second charge accumulating portion 5 as a drain, is provided over the substrate between the first charge accumulating portion 4 and the second charge accumulating portion 5 via the gate insulating film 2. The gate electrode 8 functions as a potential transferring unit that transfers the charges accumulated in the first charge accumulating portion 4 to the second charge accumulating portion 5. The gate electrode 8 is referred to as a transfer gate 8. When a high-voltage charge transfer pulse is applied to the gate electrode 8, the charges accumulated in the first charge accumulating portion 4 are transferred to the second charge accumulating portion 5. It is preferable that the first charge accumulating portion 4 should be formed as the perfect depletion layer. By doing this, the charges accumulated in the first charge accumulating portion 4 are transferred perfectly to the second charge accumulating portion 5.

A reset drain 6 formed of an n-type impurity layer of the same conductivity type as the connecting portion 3 is provided adjacent to the second charge accumulating portion 5 at a short distance from there. A variable reset drain voltage can be applied to the reset drain 6 from the outside.

A gate electrode (referred to as a "reset gate" hereinafter) 9 of a transistor, which has the second charge accumulating portion 5 as a source and the reset drain 6 as a drain, is provided over the substrate 1 between the second charge accumulating portion 5 and the reset drain 6 via the gate insulating film 2. When a high-voltage reset pulse is applied to the gate electrode 9, the charges accumulated in the second charge accumulating portion 5 are discharged to the reset drain 6.

Further, the publicly known signal output circuit formed of a MOS transistor that outputs a signal in response to the charges accumulated in the second charge accumulating portion 5 is provided on the substrate 1 every pixel. The above reset transistor is contained in this signal output circuit.

Figure 2:
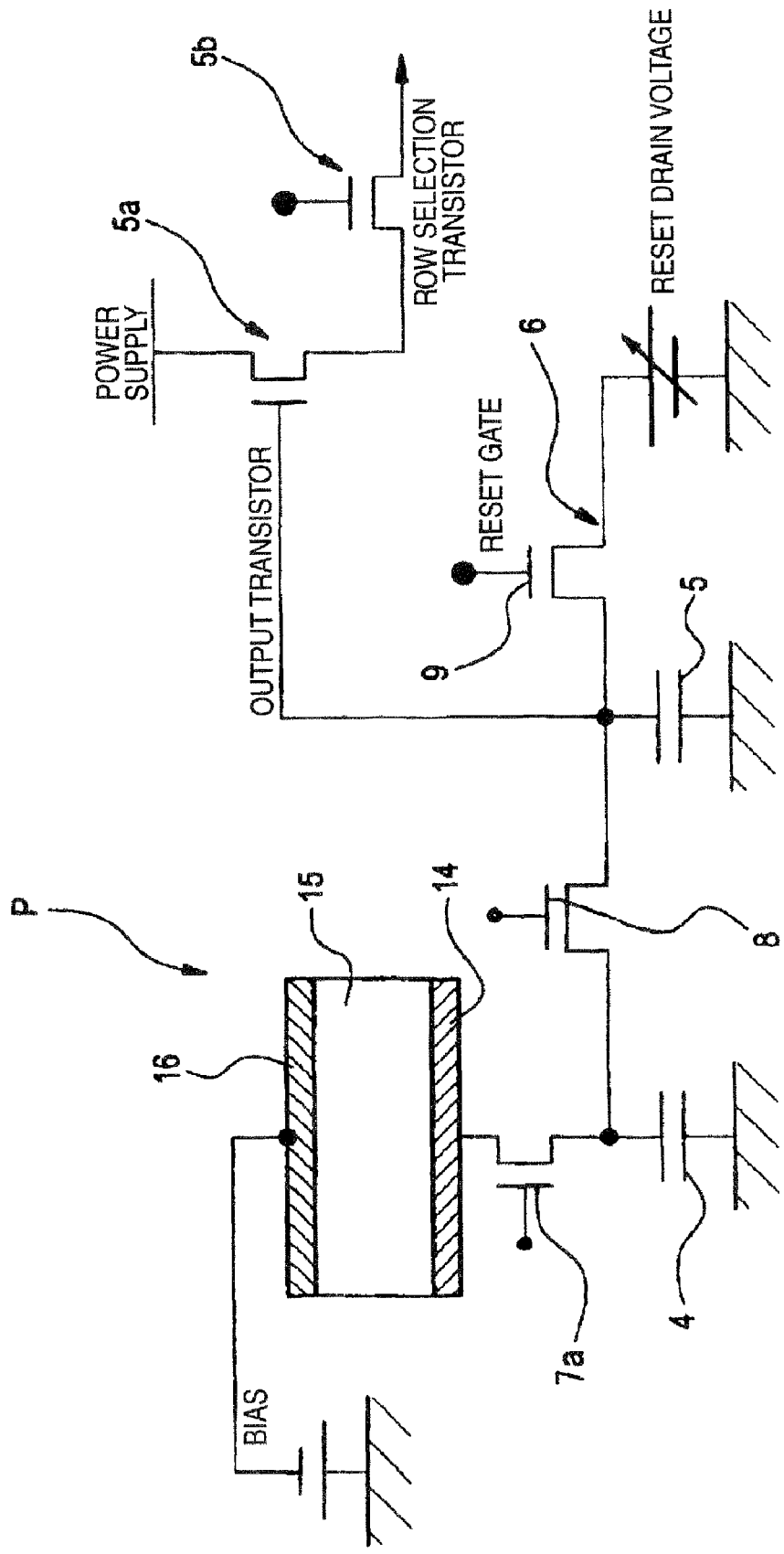
FIG. 2 is a view showing an equivalent circuit of one pixel shown in FIG. 1.

FIG. 2 is a view showing an equivalent circuit of one pixel shown in FIG. 1.

As shown in FIG. 2, the signal output circuit has an output transistor 5a and a row selection transistor 5b, in addition to the reset transistor. A gate of the output transistor 5a is connected to the second charge accumulating portion 5, a drain thereof is connected to a power supply, and a source thereof is connected to a drain of the row selection transistor 5b. The output transistor 5a outputs a voltage signal in response to a quantity of charges accumulated in the second charge accumulating portion 5.

When a row selecting pulse is applied to a gate of the row selection transistor 5b, the row selection transistor 5b outputs the voltage signal being output from the output transistor 5a to a signal line. The signal is output from all pixels respectively by applying the row selecting pulse sequentially to the signal output circuit provided to each pixel every row.

Figure 3:
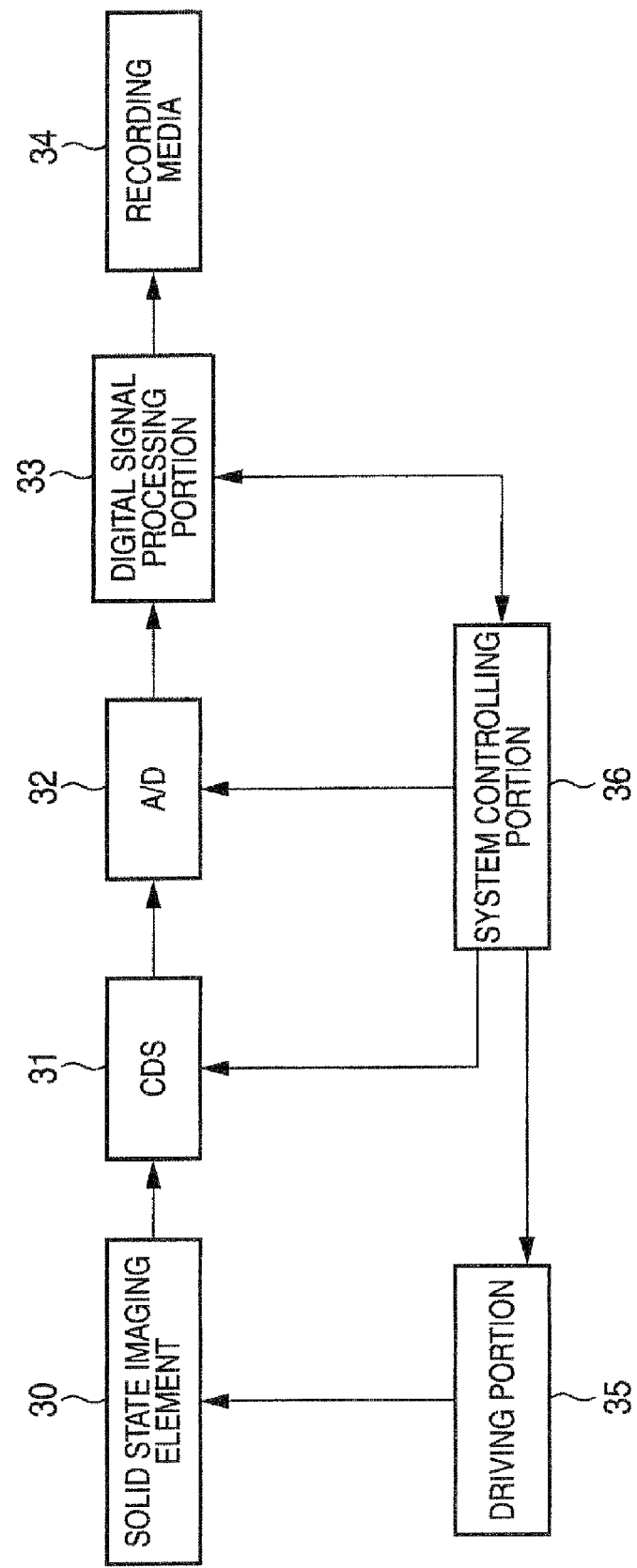
FIG. 3 is a view showing a configurative example of an imaging device into which the solid state imaging element in the first embodiment is installed.

FIG. 3 is a view showing a configurative example of an imaging device into which the solid state imaging element in the first embodiment is installed.

The imaging device shown in FIG. 3 is equipped with a solid state imaging element 30 in which the pixels shown in FIG. 1 are arranged in an array fashion, a CDS circuit 31 for removing the reset noise by applying a correlated double sampling (CDS) process to the signal acquired from each pixel of the solid state imaging element 30, an A/D converter 32 for converting an output signal of the CDS circuit 31 into a digital signal, a digital signal processing portion 33 for producing image data by applying a predetermined digital signal process to the digital signal being output from the A/D converter 32, a recording media 34 for recording the image data produced by the digital signal processing portion 33, a driving unit 35 for driving the solid state imaging element 30, and a system controlling portion 36 for unifying/controlling the overall imaging device. In this case, the solid state imaging element 30, the CDS circuit 31, and the A/D converter 32 may be incorporated into one chip (one IC).

The driving unit 35 performs variable control of the reset drain voltage, application control of the reset pulse to the reset gate 9, application control of the charge transfer pulse to the charge transfer gate 8, application control of the row selection pulse to the row selection transistor 5b, and the like.

In the imaging device constructed in this manner, in the shooting mode in which shooting for acquiring a through image, shooting for a moving picture, shooting for executing AE/AF, etc. are executed, the connecting portion 3 and the potential barrier portion 7 are set to a same potential by injecting the charges into the potential well, which is formed in the connecting portion 3 due to a thermal diffusion, immediately before the exposure for producing images such as the through image is started, and then the exposure is started. An operation of the imaging device executed when the connecting portion 3 and the potential barrier portion 7 are set to a same potential will be explained hereunder. In this case, explanation will be made on the assumption that the electron is selected as the handling charge. For this purpose, a potential diagram used in the explanation hereunder is illustrated on the assumption that the potential is increased from the top toward the bottom in the diagram.

Figure 4:
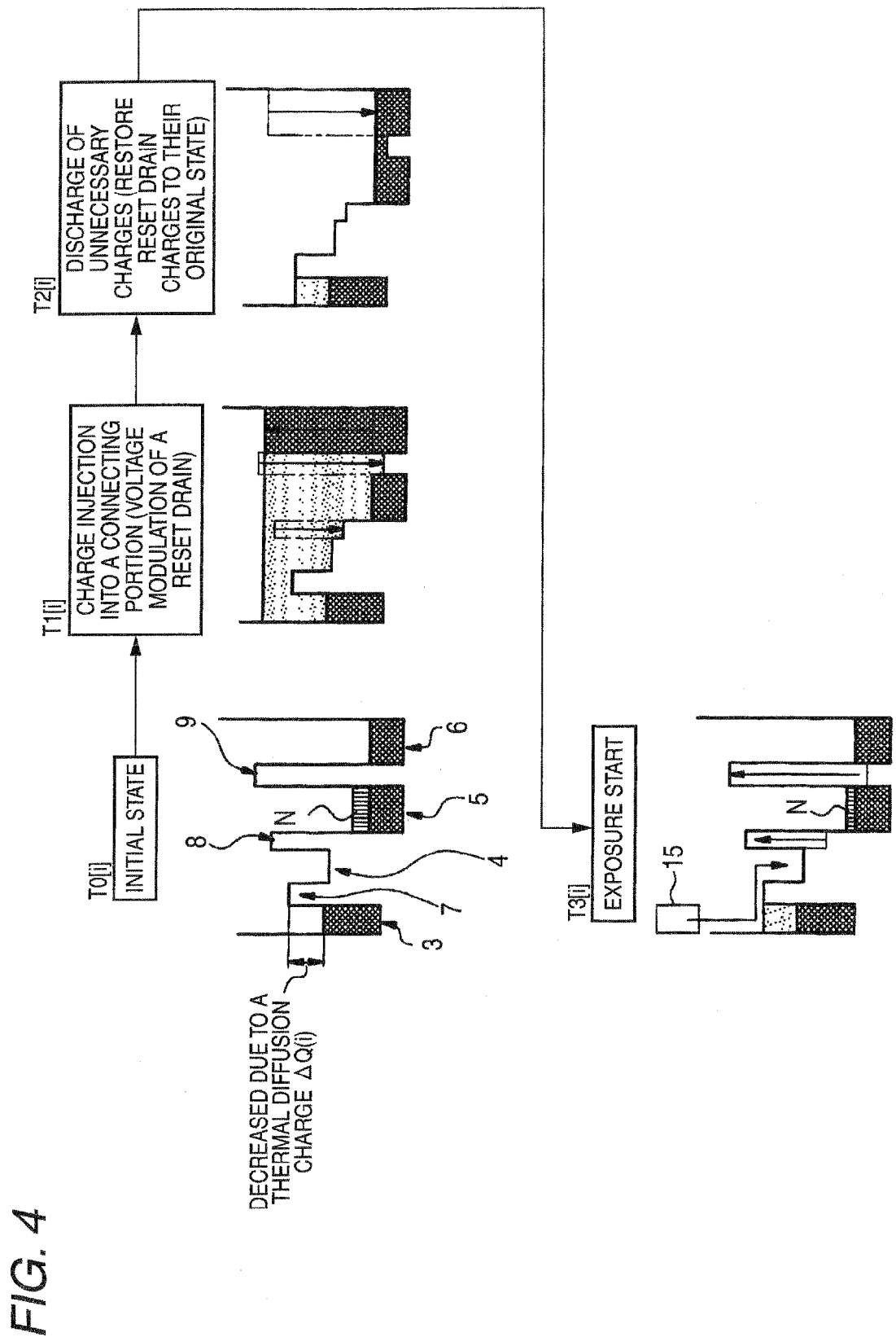
FIG. 4 is a view showing an operation executed when a connecting portion 3 and a potential barrier portion 7 are set to a same potential respectively in respective pixels in an i-th line of the solid state imaging element in the first embodiment.

FIG. 4 is a view showing an operation executed when the connecting portion 3 and the potential barrier portion 7 are set to a same potential respectively in the shooting mode in respective pixels in a line (i-th line) that consists of the pixels aligned in the row direction of the solid state imaging element in the first embodiment. FIG. 4 shows a sectional potential of respective pixels in the i-th line in the substrate 1 at each time. First, a state at a time $T0[i]$ is set as an initial state. The initial state is defined as such a state that the charge transfer pulse is not applied to the transfer gate 8 of respective pixels in the i-th line, the reset pulse is not applied to the reset gate 9 of respective pixels in the i-th line, and the potential of the reset drain 6 of respective pixels in the i-th line is set to a predetermined value (a value that is sufficiently higher than the potential of the first charge accumulating portion 4). In the initial state, the charges in the connecting portion 3 are decreased by $\Delta Q$ due to a thermal diffusion.

From this initial state, the driving unit 35 decreases the potential of the reset drain 6 of respective pixels in the i-th line lower than the potential of the potential barrier portion 7 by lowering the reset drain voltage, applies the charge transfer pulse to the transfer gate 8 of respective pixels in the i-th line, and applies the reset pulse to the reset gate 9 of respective pixels in the i-th line. Therefore, the charges are injected into the second charge accumulating portion 5, the first charge accumulating portion 4, and the connecting portion 3 from the reset drain 6. As a result, all portions from the reset drain 6 to the connecting portion 3 are set to the same potential, and the potential well formed in the connecting portion 3 due to a thermal diffusion is buried perfectly by the injected charges (time $T1[i]$).

Then, the driving unit 35 restores the reset drain voltage to the value of an initial state, and restores the potential of the reset drain 6 of respective pixels in the i-th line to the predetermined value. Accordingly, the unnecessary charges out of the charges injected from the reset drain 6 except the charges filled in the potential well of the connecting portion 3 are discharged (time $T2[i]$).

Then, the driving unit 35 stops the application of the charge transfer pulse to the transfer gate 8 of respective pixels in the i-th line and the application of the reset pulse to the reset gate 9 of respective pixels in the i-th line, and starts the exposure from this state and accumulates the charges generated in the photoelectric converting layer 15 during the exposure in the first charge accumulating portion 4 (time $T3[i]$).

After the exposure is ended, the driving unit 35 causes the signal output circuit to output a reset noise signal (dark) that responds to the reset noise N in the second charge accumulating portion 5 of respective pixels in the i-th line. The output reset noise signal (dark) is sampled in the CDS circuit 31.

Then, the driving unit 35 applies the charge transfer pulse to the transfer gate 8 of respective pixels in the i-th line to transfer the charges from the first charge accumulating portion 4 to the second charge accumulating portion 5. Then, the driving unit 35 causes the signal output circuit to output an imaging signal (Sig) that responds to the charges transferred to the second charge accumulating portion 5 of respective pixels in the i-th line. The output imaging signal (Sig) is sampled in the CDS circuit 31, and undergoes the (Sig)-(dark) process to eliminate the signal responding to the reset noise N.

Then, the driving unit 35 applies the reset pulse to the reset gate 9 of respective pixels in the i-th line. Thus, the charges existing in the second charge accumulating portion 5 of respective pixels in the i-th line are discharged to the reset drain 6. Then, the driving unit 35 stops the application of the charge transfer pulse to the transfer gate 8 of respective pixels in the i-th line and the application of the reset pulse to the reset gate 9 of respective pixels in the i-th line, and then goes back to the initial state.

The driving unit 35 executes the above-mentioned drives while shifting the timing every line whose value of i is different.

In this case, in a time T1[i], even though the application of the charge transfer pulse to the transfer gate 8 is omitted, the charges can be injected in the connecting portion 3. In this case, in a time T2[i], the unnecessary charges may be discharged by performing the application of the charge transfer pulse to the transfer gate 8 and the application of the reset pulse to the reset gate 9. Also, in a time T1[i], when the potential of the reset drain 6 is set lower than the potential of the reset gate 9, the application of the reset pulse to the reset gate 9 can be omitted. In this case, in a time T2[i], the unnecessary charges may also be discharged by performing the application of the charge transfer pulse to the transfer gate 8 and the application of the reset pulse to the reset gate 9.

As described above, according to the imaging device of the present embodiment, the charges are injected from the reset drain 6 to the connecting portion 3, and thus the exposure can be carried out in a state that the connecting portion 3 and the potential barrier portion 7 are set to the same potential respectively. Therefore, such a situation can be prevented that a part of the charges produced in the photoelectric converting layer 15 during the exposure remain in the connecting portion 3, and occurrence of the lag can be prevented. Also, since the potential of the connecting portion 3 (which becomes equal to the potential of the potential barrier portion 7) in starting the exposure can be known, a reference level of the output signal can be set. As a result, the linearity correction of the signal output characteristic with respect to a quantity of incident light can be applied, and the signal output characteristic can be set linearly.

Here, when the exposure is performed in a state that there exists a potential difference between the connecting portion 3 and the potential barrier portion 7, it is unfeasible to decide how much charge is input from the photoelectric converting layer 15. As a result, a linearity of the signal output characteristic with respect to a quantity of incident light cannot be maintained. Also, in the initial state shown in FIG. 4, the potential of the connecting portion 3 is varied at any time depending upon a quantity of charges that pass through the connecting portion 3 until now, a time, and the like. As a result, the signal output characteristic to a quantity of incident light loses the regularity, and the linearity correction cannot be applied. An addition, this potential varies pixel by pixel.

On the contrary, when the present driving method is employed, the exposure can be performed in a state that the connecting portion 3 and the potential barrier portion 7 become equal to the same potential. Therefore, it is possible to set a reference level of the signal. As a result, the regularity can be provided to the signal output characteristic with respect to a quantity of incident light, and the linearity can be corrected systematically.

Figure 5:
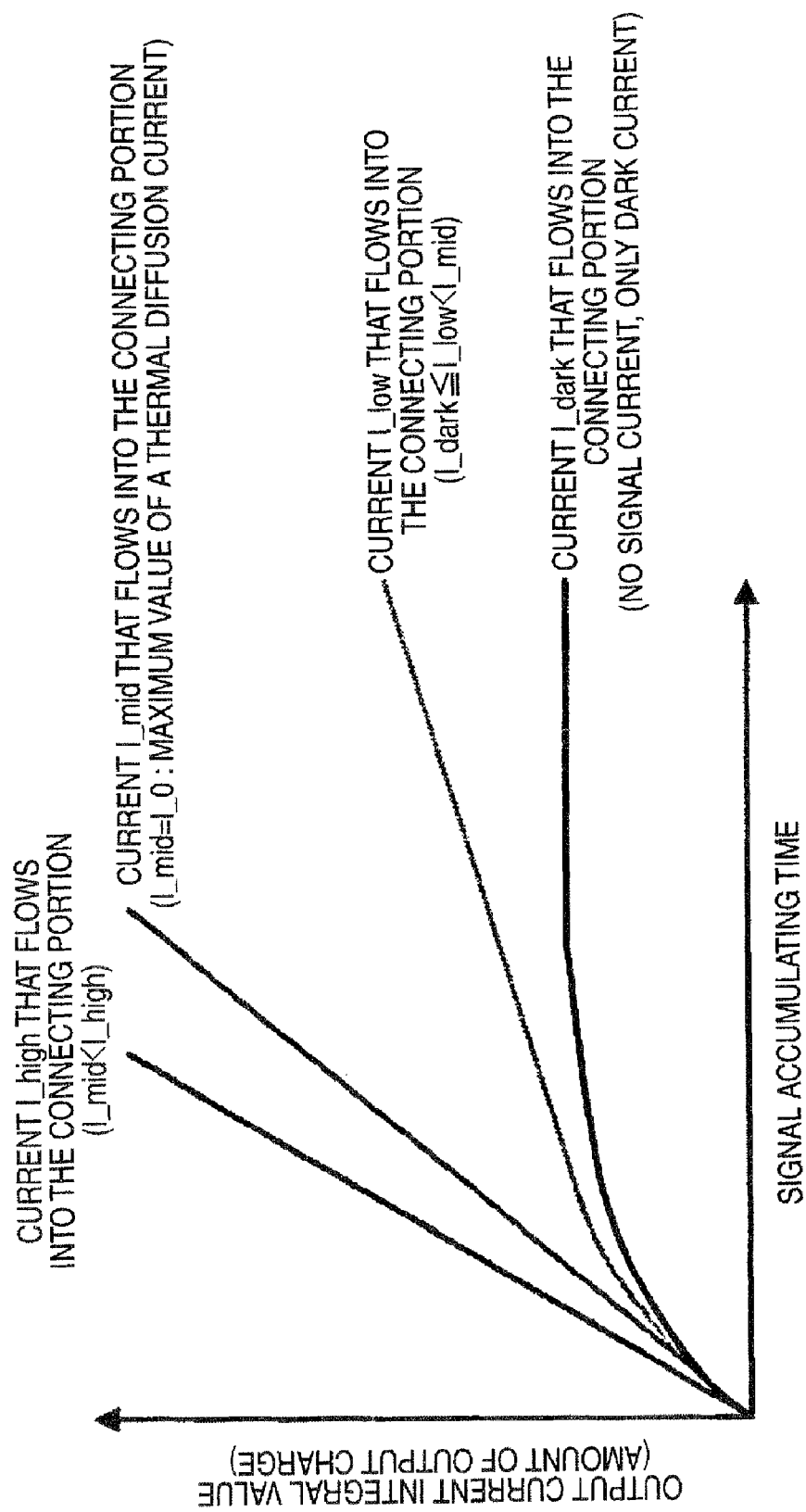
FIG. 5 is a conceptual view showing a signal output characteristic with regard to a signal accumulation time when a driving system in the first embodiment is employed.

FIG. 5 is a conceptual view showing the signal output characteristic with regard to a signal accumulation time when the driving system in the first embodiment is employed.

If the present characteristic is recorded in advance in the imaging system, the linearity correction can be made systematically, and the signal output characteristic with respect to a quantity of incident light can be set linearly. A quantity of current emitted due to a thermal excitation is decreased exponentially with time (see Expression (1)). Then, when a quantity of emitted current and a quantity of current flowing into the connecting portion 3 are balanced (dark current+signal current responding to the subject), a thermal equilibrium state is attained and a quantity of current emitted due to a thermal excitation becomes zero apparently. Therefore, the output characteristic with respect to the input signal becomes a function of a signal accumulation time like FIG. 5. In this manner, when the signal accumulation time (exposure time) and a quantity of output charges are known, a quantity of signal current can be known from a graph shown in FIG. 5 and as a result the linearity correction can be attained.

(Second Embodiment)

In the driving system of the first embodiment, the charges flow into the first charge accumulating portion 4 from the connecting portion 3 due to a thermal diffusion in a period where the signal responding to the charges generated by the exposure is outputted, which may cause the noise. In the present embodiment, the driving system capable of preventing the generation of such noise will be explained hereunder.

A basic configuration of an imaging device of the present embodiment is similar to that in the first embodiment. A difference resides in that the driving unit 35 can control variably a voltage applied to the barrier gate 7a and can control variably the potential of the potential barrier portion 7.

Figure 6:
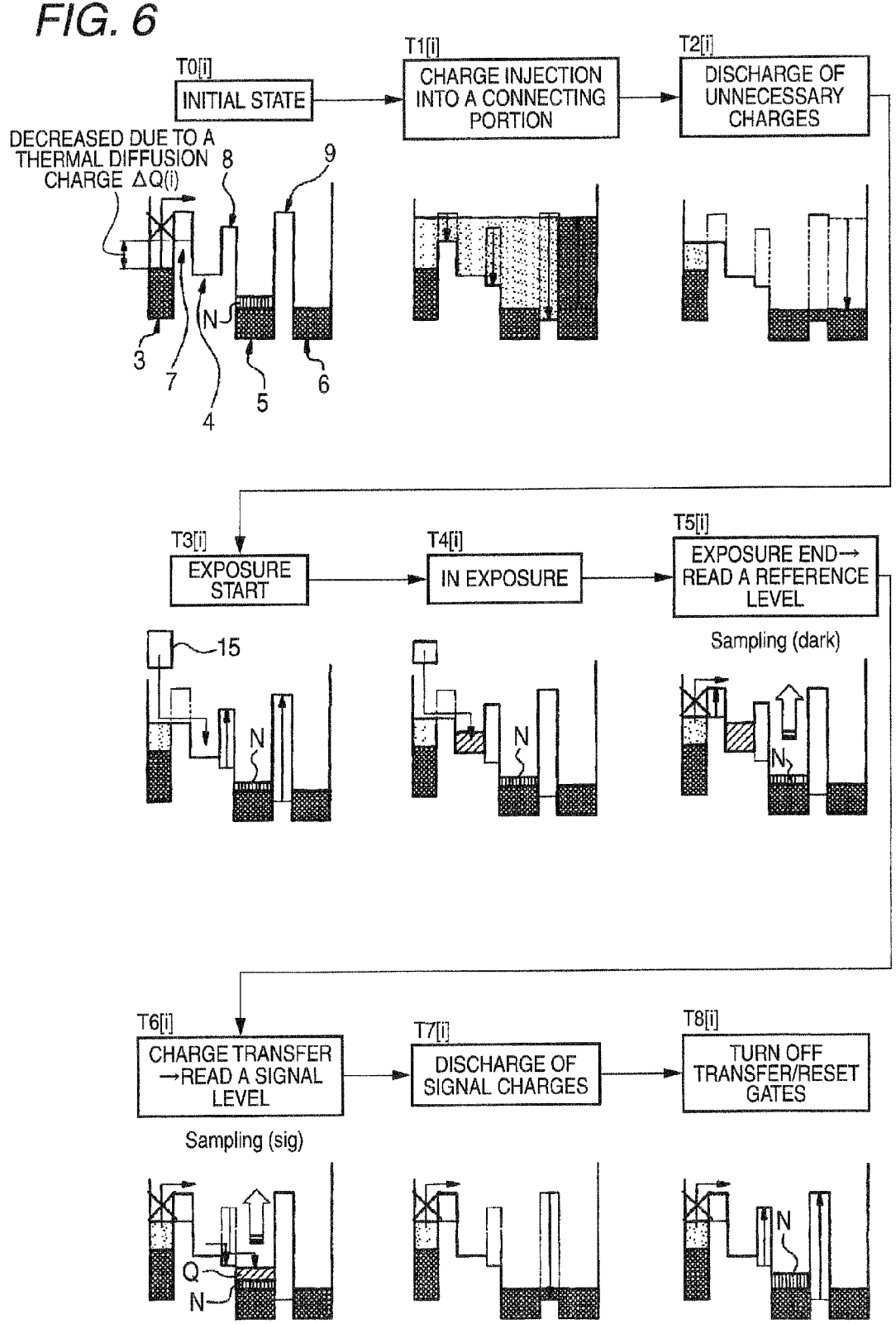
FIG. 6 is a view showing an operation in an imaging mode of an imaging device into which a solid state imaging element in a second embodiment is installed.

FIG. 6 is a view showing an operation in an imaging mode of the imaging device into which a solid state imaging element in the second embodiment is installed. FIG. 6 shows a sectional potential in the substrate 1 at respective times of respective pixels in the i-th line.

First, a state at a time T0[i] is set as an initial state. The initial state is defined as such a state that the potential of the potential barrier portion 7 of respective pixels in the i-th line is set to a first potential that is sufficiently smaller than the exposure potential to be set during an exposure period, the charge transfer pulse is not applied to the transfer gate 8 of respective pixels in the i-th line, the reset pulse is not applied to the reset gate 9 of respective pixels in the i-th line, and the potential of the reset drain 6 of respective pixels in the i-th line is set to a predetermined value (a value that is sufficiently higher than the potential of the first charge accumulating portion 4). In the initial state, the charges in the connecting portion 3 are decreased due to a thermal diffusion, and the potential well is formed in the connecting portion 3. Also, the reset noise N generated by the preceding reset operation is accumulated in the second charge accumulating portion 5. Here, the exposure potential and the first potential have a value that is decided at will at a time of design respectively.

From this initial state, the driving unit 35 decreases the potential of the reset drain 6 of respective pixels in the i-th line lower than the exposure potential by lowering the reset drain voltage, sets the potential of the potential barrier portion 7 of respective pixels in the i-th line to the exposure potential by increasing the voltage applied to the barrier gate 7a in the i-th line, applies the charge transfer pulse to the transfer gate 8 of respective pixels in the i-th line, and applies the reset pulse to the reset gate 9 of respective pixels in the i-th line.

Accordingly, the charges are injected into the second charge accumulating portion 5, the first charge accumulating portion 4, and the connecting portion 3 from the reset drain 6. Then, all potentials from the reset drain 6 to the connecting portion 3 become equal to the potential of the reset drain 6, and thus the potential well formed in the connecting portion 3 due to thermal diffusion is buried completely by the injected charges (time T1[i]).

Then, the driving unit 35 restores the reset drain voltage to the value in the initial state, and restores the potential of the reset drain 6 of respective pixels in the i-th line to the predetermined value. Accordingly, the unnecessary charges (containing the charges in the connecting portion 3 that forms the potential lower than the exposure potential) out of the charges injected from the reset drain 6 except the charges filled in the potential well of the connecting portion 3 are discharged to the reset drain 6, and the connecting portion 3 and the potential barrier portion 7 have the same potential (time T2[i]).

Then, the driving unit 35 stops the application of the charge transfer pulse to the transfer gate 8 of respective pixels in the i-th line and the application of the reset pulse to the reset gate 9 of respective pixels in the i-th line, and then starts the exposure from this state to accumulate the charges being generated in the photoelectric converting layer 15 during the exposure period in the first charge accumulating portion 4 (time T3[i], time T4[i]). The charges Q generated in the photoelectric converting layer 15 reach the connecting portion 3, and are accumulated in the first charge accumulating portion 4 via the potential barrier portion 7. At this time, only the reset noise N generated by the preceding reset operation is accumulated in the second charge accumulating portion 5.

When the exposure period being set comes to an end time, the driving unit 35 lowers the voltage applied to the barrier gate 7a and restores the potential of the potential barrier portion 7 of respective pixels in the i-th line to the first potential (the value in the initial state). At this time, a large potential difference (equal to a difference between the exposure potential and the first potential) is caused between the connecting portion 3 and the potential barrier portion 7. Therefore, an inflow of the charges into the first charge accumulating portion 4 from the connecting portion 3 due to thermal diffusion is reduced to a negligibly small amount. In this case, a difference between the exposure potential and the first potential may be set to such a value that a quantity of current that flows into the first charge accumulating portion 4 from the connecting portion 3 can be regarded negligibly small.

The driving unit 35 sets the potential of the potential barrier portion 7 to the first potential, and then causes the signal output circuit to the reset noise signal (dark) that responds to the reset noise N existing in the second charge accumulating portion 5 of respective pixels in the i-th line (time T5[i]). This reset noise signal (dark) is sampled by the CDS circuit 31.

Then, the driving unit 35 applies the charge transfer pulse to the transfer gate 8 of respective pixels in the i-th line, and thus transfers the charges Q accumulated in the first charge accumulating portion 4 of respective pixels in the i-th line to the second charge accumulating portion 5 (time T6[i]).

After the transfer of the charges Q is completed, the driving unit 35 causes the signal output circuit to output an imaging signal (sig) responding to the charges (Q+N) that exist in the second charge accumulating portion 5 of respective pixels in the i-th line. The imaging signal (sig) is sampled by the CDS circuit 31, and only the signal responding to the reset noise N is removed by executing the (sig)-(dark) process.

Then, the driving unit 35 applies the reset pulse to the reset gate 9 of respective pixels in the i-th line. Accordingly, the charges (Q+N) that exist in the second charge accumulating portion 5 of respective pixels in the i-th line are discharged to the reset drain 6 (time T7[i]). Then, the driving unit 35 stops the application of the charge transfer pulse to the transfer gate 8 of respective pixels in the i-th line and the application of the reset pulse to the reset gate 9 of respective pixels in the i-th line (time T8[i]). Then, the imaging device goes back to the initial state.

The driving unit 35 executes the drives from T0[i] to T8[i] while shifting the timing every line whose value of i is different.

As described above, according to the imaging device of the present embodiment, such an event can be prevented that the charges move from the connecting portion 3 to the first charge accumulating portion 4 during the signal output from the signal output circuit (time T5[i] and time T6[i] in FIG. 6). Therefore, the noise due to the charges can be suppressed, and the high-quality shooting can be performed.

Also, according to the imaging device of the present embodiment, the first charge accumulating portion 4 for storing temporarily the charges generated in the exposure period is provided. Therefore, the sampling of the reset noise signal (dark) and the sampling of the imaging signal (sig) can be executed in a minute time interval, which is shorter than the exposure period of the solid state imaging element, between a time T5[i] and a time T6[i] in FIG. 6. Also, the noise signal due to the reset noise contained in the imaging signal can be removed precisely.

Also, according to the solid state imaging element of the present embodiment, the photoelectric converting element P is provided not in the substrate 1 but over the substrate 1. Therefore, a space that is enough to add the first charge accumulating portion 4 can be ensured in the substrate 1. In the case of the common solid state imaging element in which the photodiode is formed in the substrate 1, when the first charge accumulating portion 4 is added in the substrate, it is difficult to keep a space for the photodiode and a reduction in sensitivity is feared. Also, it is feared that, in order to keep a sensitivity, a reduction in the number of pixels, an increase of chip size, or the like is caused. According to the solid state imaging element of the present embodiment, such fear is never caused.

In the explanation in FIG. 6, the potential of the potential barrier portion 7 is set to the exposure potential at a time T1[i]. In this case, the timing at which the potential of the potential barrier portion 7 is set to the exposure potential may be set to any timing if such timing is in a period that extends from a time T6[i], at which the output of the signal is completed, to a time T2[i], at which the discharge of the unnecessary charges is completed.

For example, the potential of the potential barrier portion 7 may be set to the exposure potential after the time T7[i], and thus the potential barrier portion 7 may be set to the exposure potential in the initial state. Also, the potential of the potential barrier portion 7 may be kept still at the first potential in a time T1[i], and then the charges may be injected in the connecting portion 3 in a state that the potential of the reset drain 6 is set lower than the first potential. Also, the unnecessary charges may be discharged by setting the potential barrier portion 7 to the exposure potential in a time T2[i] and then applying the charge transfer pulse and the reset pulse.

(Third Embodiment)

In a third embodiment, another method of setting the connecting portion 3 and the potential barrier portion 7 to the same potential in the imaging device explained in the first embodiment will be explained hereunder.

Figure 7:
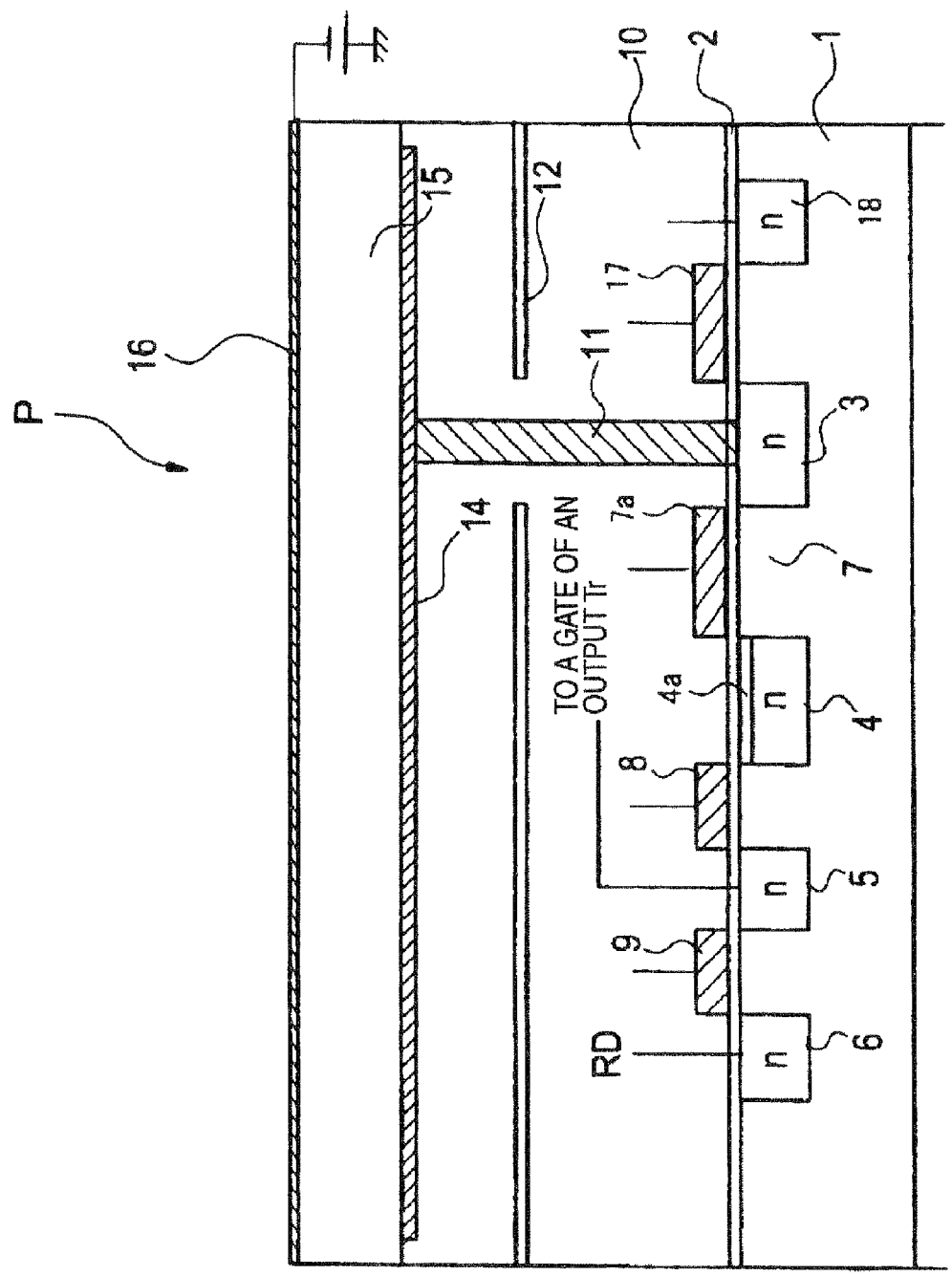
FIG. 7 is a schematic sectional view showing one pixel of a solid state imaging element as a third embodiment of the present invention.

FIG. 7 is a schematic sectional view showing one pixel of a solid state imaging element that is installed into the imaging device in a third embodiment of the present invention. In FIG. 7, the same reference symbols are affixed to the same configurations as those in FIG. 1.

The solid state imaging element shown in FIG. 7 is constructed by adding a charge injection transistor, which is provided to inject the charges to the connecting portion 3, to the solid state imaging element shown in FIG. 1.

This charge injection transistor is constructed by the connecting portion 3, an n-type impurity layer 18 provided adjacent to the connecting portion 3 in the substrate 1 at a short distance from there, and a gate electrode 17 provided between the connecting portion 3 and the n-type impurity layer 18 over the substrate 1 via the gate insulating film 2.

The connecting portion 3 functions as a source of the charge injection transistor, the n-type impurity layer 18 functions as a source of the charge injection transistor, and the gate electrode 17 functions as gate of the charge injection transistor. The n-type impurity layer 18 is referred to as the charge injection source 18, and the gate electrode 17 is referred to as the charge injection gate 17.

A configuration of the imaging device of the present embodiment is similar to that shown in FIG. 3. In this case, the driving unit 35 of the imaging device of the present embodiment has a function of controlling the power supply connected to the charge injection source 18 such that the potential of the charge injection source 18 is controlled into either of two potentials, i.e., a high potential that is higher than the potential of the substrate 1 under the charge injection gate 17 and a low potential that is lower than the potential of the substrate 1 under the charge injection gate 17.

An operation of the imaging device executed when the connecting portion 3 and the potential barrier portion 7 are set to the same potential will be explained hereunder.

Figure 8:
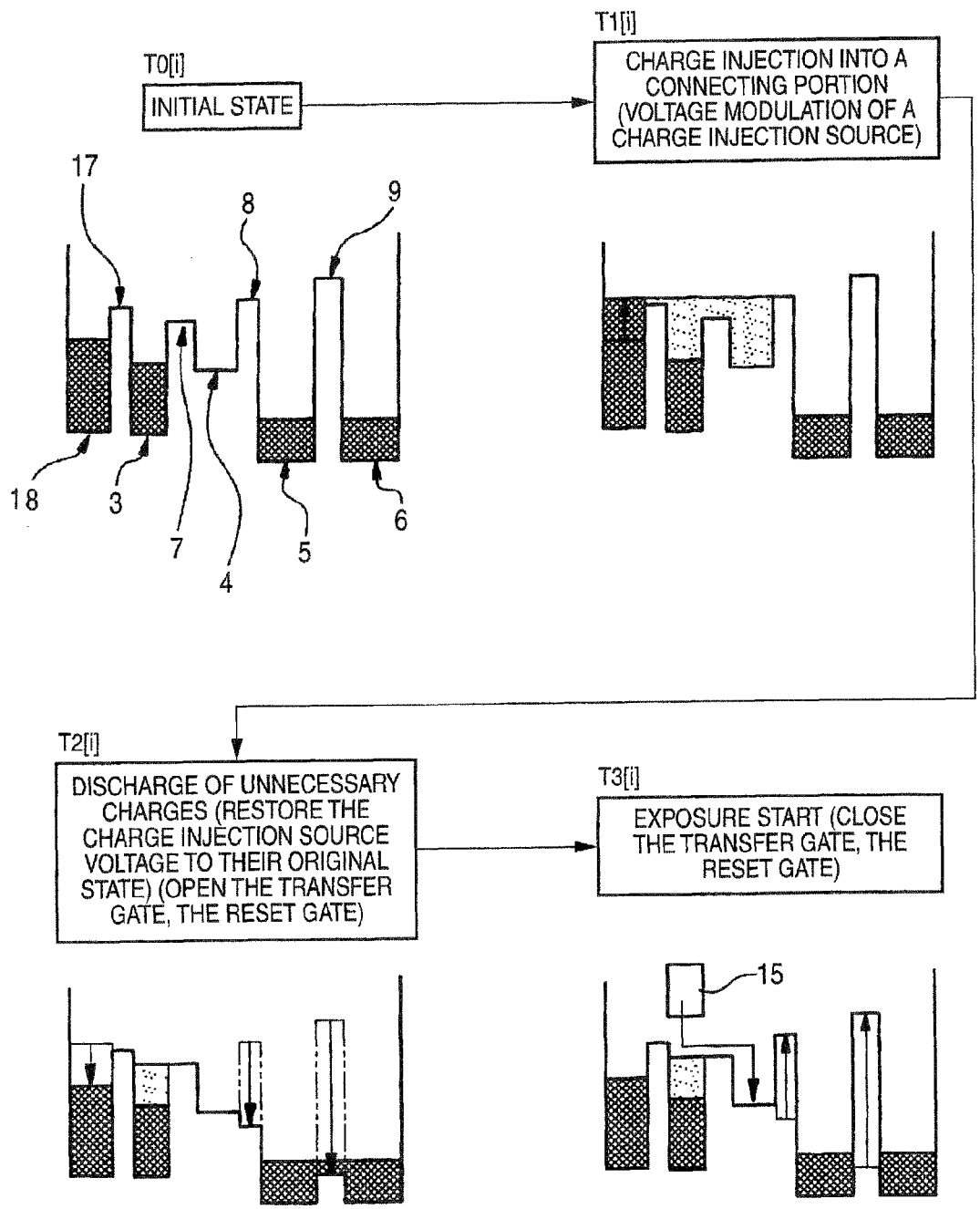
FIG. 8 is a view showing an operation executed when a connecting portion 3 and a potential barrier portion 7 are set to a same potential respectively in respective pixels in an i-th line of the solid state imaging element in the third embodiment.

FIG. 8 is a view showing an operation executed when the connecting portion 3 and the potential barrier portion 7 are set to the same potential respectively in respective pixels in the i-th line of the solid state imaging element in the third embodiment. FIG. 8 shows a sectional potential in the substrate 1 at respective times of respective pixels in the i-th line.

First, a state at a time T0[$i$] is set as an initial state. The initial state is defined as such a state that the potential of the charge injection source 18 of respective pixels in the i-th line is set to a high potential, the charge transfer pulse is not applied to the transfer gate 8 of respective pixels in the i-th line, the reset pulse is not applied to the reset gate 9 of respective pixels in the i-th line, and the potential of the reset drain 6 of respective pixels in the i-th line is set to a predetermined value (a value that is sufficiently higher than the potential of the first charge accumulating portion 4). In the initial state, the charges in the connecting portion 3 are decreased due to thermal diffusion.

The driving unit 35 sets the potential of the charge injection source 18 of respective pixels in the i-th line to a low potential from this initial state. Accordingly, the charges are injected into the connecting portion 3 and the first charge accumulating portion 4 from the charge injection source 18. Thus, respective portions from the charge injection source 18 to the first charge accumulating portion 4 are set to the same potential as the charge injection source 18, and the potential well formed in the connecting portion 3 due to the thermal diffusion is buried perfectly by the injected charges (time T1[$i$]).

Then, the driving unit 35 restores potential of the charge injection source 18 of respective pixels in the i-th line to the high potential, applies the charge transfer pulse to the transfer gate 8 of respective pixels in the i-th line, and applies the reset pulse to the reset gate 9 of respective pixels in the i-th line. Accordingly, the unnecessary charges out of the charges being injected from the charge injection source 18 except the charges that are buried in the potential well of the connecting portion 3 are discharged to the reset drain 6 (time T2[$i$]).

Then, the driving unit 35 stops the application of the charge transfer pulse to the transfer gate 8 of respective pixels in the i-th line and the application of the reset pulse to the reset gate 9 of respective pixels in the i-th line, and starts the exposure in this state to accumulate the charges being generated in the photoelectric converting layer 15 during the exposure in the first charge accumulating portion 4 (time T3[$i$]). Since the operation after the exposure is ended is similar to that in the first embodiment, its explanation will be omitted herein.

As described above, the exposure can also be executed by utilizing the charge injection transistor in a state that the connecting portion 3 and the potential barrier portion 7 are set to the same potential. A change of potential of the charge injection source 18 can be suppressed smaller than a change of potential of the reset drain 6 explained in the first embodiment. Therefore, power consumption can be decreased in contrast to the imaging device in the first embodiment.

In the imaging device of the third embodiment, the noise can also be reduced by using the method of variably controlling the potential of the potential barrier portion 7 explained in the second embodiment in combination. In this case, the exposure is started at a time T3[$i$] in FIG. 8, and the potential of the potential barrier portion 7 is set to the potential that is sufficiently lower than the potential in the exposure period at a time this exposure is ended. Then, the potential of the potential barrier portion 7 may be set to the same potential as that in the exposure period within a period from the end of the signal output to the discharge of the unnecessary charges at a time T2[$i$] (e.g., immediately before a time T0[$i$] in FIG. 8, or a time T1[i] or T2[$i$]).

(Fourth Embodiment)

In the present embodiment, still another method of setting the connecting portion 3 and the potential barrier portion 7 to the same potential in the imaging device explained in the first embodiment will be explained hereunder.

A configuration of the imaging device of the present embodiment is similar to that explained in the third embodiment. In this case, the driving unit 35 of the imaging device of the present embodiment fixes the potential of the charge injection source 18, and makes the control to set the potential of the charge injection gate 17 to either of two potentials, i.e., a high potential that is higher than the potential of the charge injection source 18 and a low potential that is lower than the potential of the charge injection source 18.

An operation of the imaging device executed when the connecting portion 3 and the potential barrier portion 7 are set to the same potential will be explained hereunder.

Figure 9:
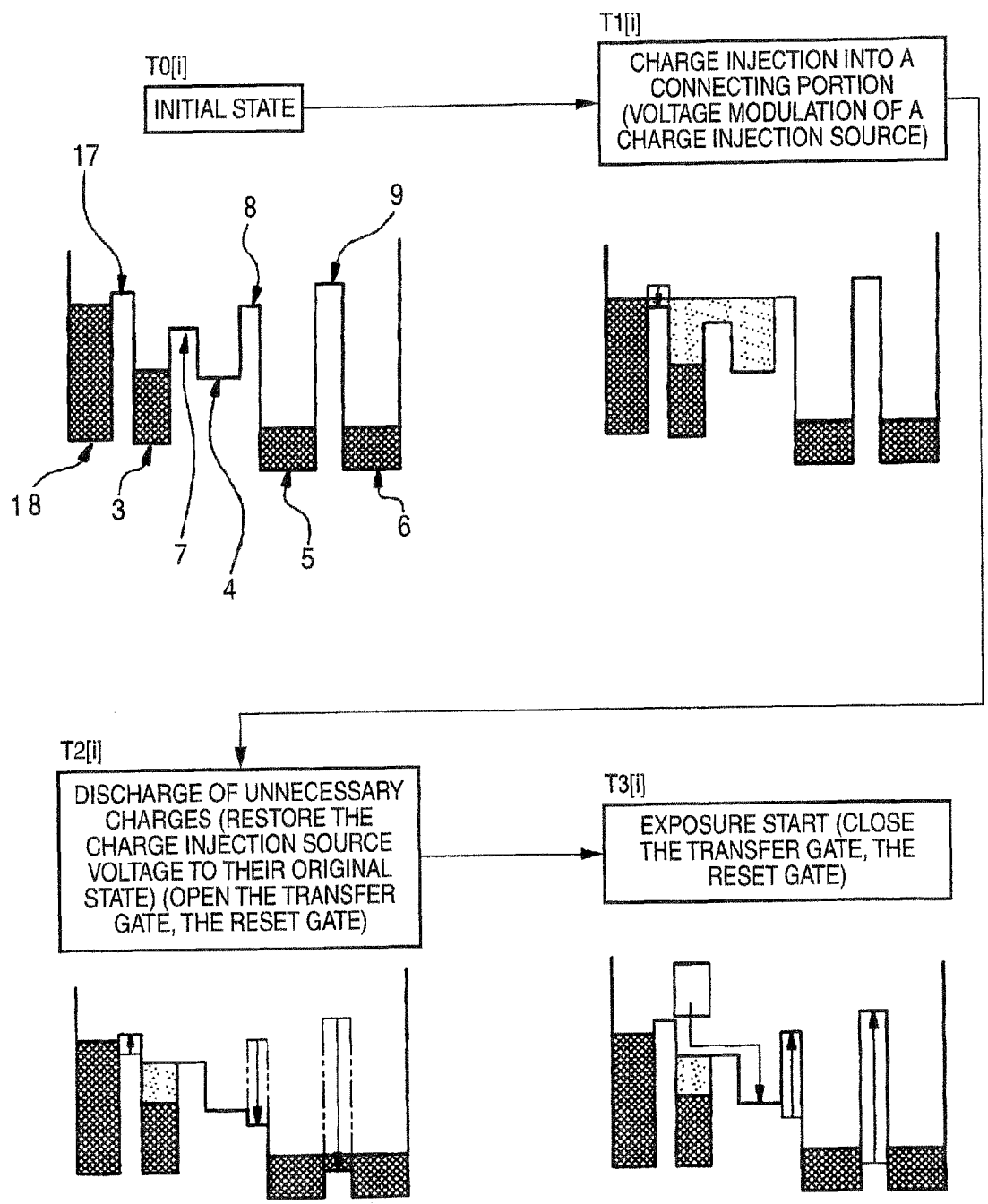
FIG. 9 is a view showing an operation executed when a connecting portion 3 and a potential barrier portion 7 are set to a same potential respectively in respective pixels in an i-th line of the solid state imaging element in a fourth embodiment.
Figure 10:
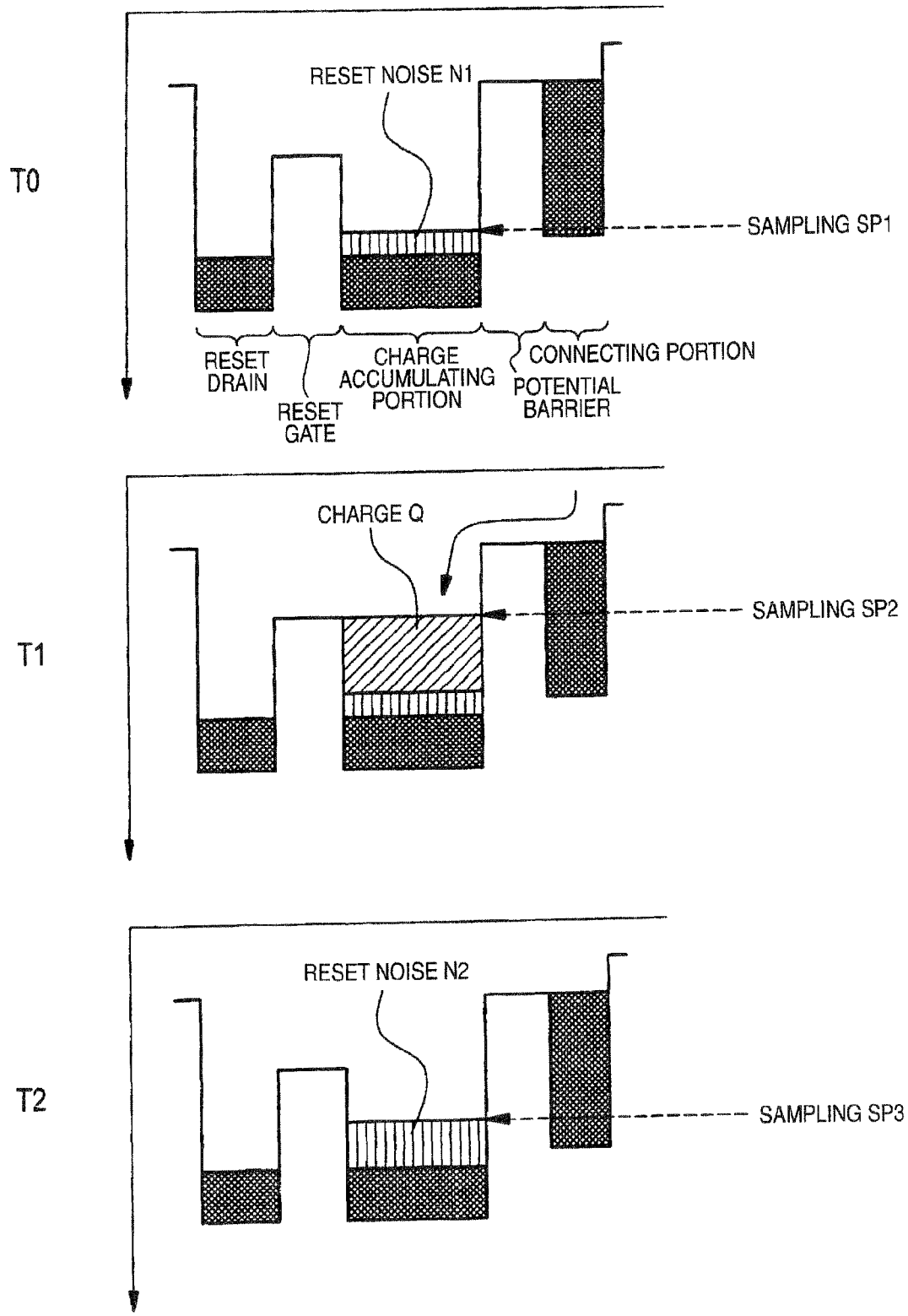
FIG. 10 is a view explaining an operation of a solid state imaging element disclosed in related art.
Figure 11:
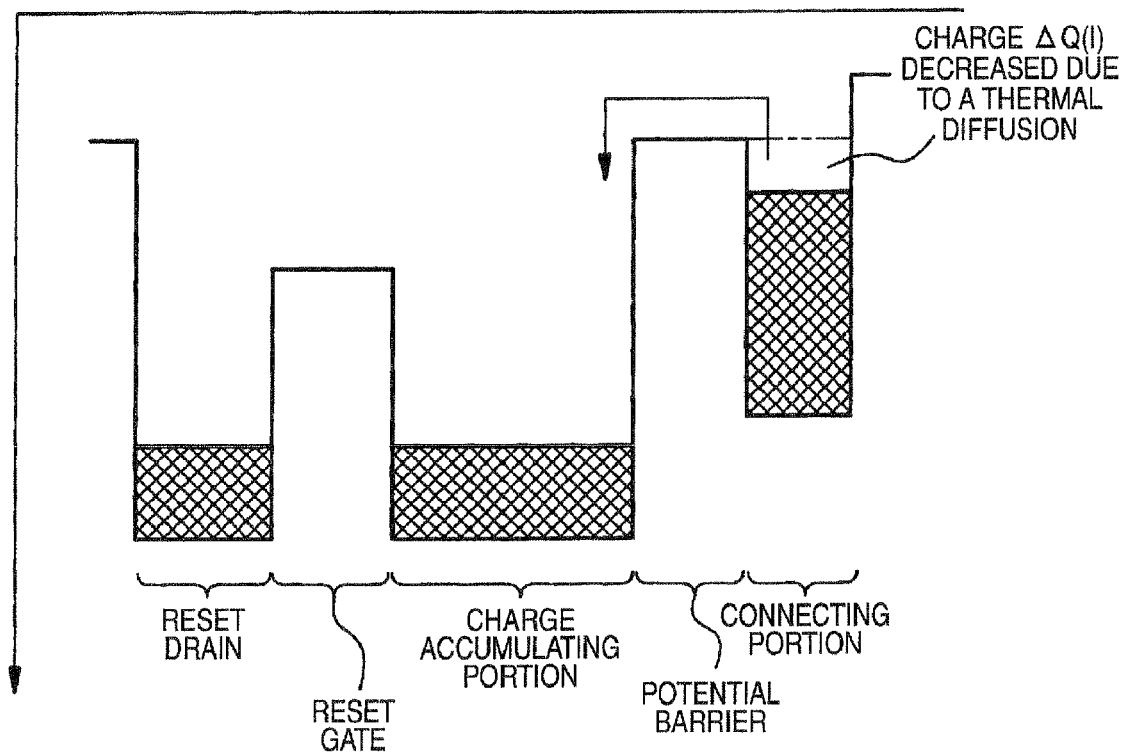
FIG. 11 is a view showing a variation of a potential of the connecting portion caused due to a thermal diffusion.

FIG. 9 is a view showing an operation executed when the connecting portion 3 and the potential barrier portion 7 are set to the same potential in respective pixels in the i-th line of the solid state imaging element in a fourth embodiment. FIG. 9 shows a sectional potential in the substrate 1 at respective times of respective pixels in the i-th line.

First, a state at a time T0[$i$] is set as an initial state. The initial state is defined as such a state that the potential of the charge injection gate 17 of respective pixels in the i-th line is set to a low potential, the charge transfer pulse is not applied to the transfer gate 8 of respective pixels in the i-th line, the reset pulse is not applied to the reset gate 9 of respective pixels in the i-th line, and the potential of the reset drain 6 of respective pixels in the i-th line is set to a predetermined value (a value that is sufficiently higher than the potential of the first charge accumulating portion 4). In the initial state, the charges in the connecting portion 3 are decreased due to thermal diffusion.

The driving unit 35 sets the potential of the charge injection gate 17 of respective pixels in the i-th line to a high potential from this initial state. Accordingly, the charges are injected into the connecting portion 3 and the first charge accumulating portion 4 from the charge injection source 18. Thus, respective portions from the charge injection source 18 to the first charge accumulating portion 4 are set to the same potential as the charge injection source 18, and the potential well formed in the connecting portion 3 due to the thermal diffusion is buried perfectly by the injected charges (time T1[$i$]).

Then, the driving unit 35 restores potential of the charge injection gate 17 of respective pixels in the i-th line to the high potential, applies the charge transfer pulse to the transfer gate 8 of respective pixels in the i-th line, and applies the reset pulse to the reset gate 9 of respective pixels in the i-th line. Accordingly, the unnecessary charges out of the charges being injected from the charge injection source 18 except the charges that are buried in the potential well of the connecting portion 3 are discharged to the reset drain 6 (time T2[$i$]).

Then, the driving unit 35 stops the application of the charge transfer pulse to the transfer gate 8 of respective pixels in the i-th line and the application of the reset pulse to the reset gate 9 of respective pixels in the i-th line, and starts the exposure in this state to accumulate the charges being generated in the photoelectric converting layer 15 during the exposure in the first charge accumulating portion 4 (time T3[$i$]). Since the operation after the exposure is ended is similar to that in the first embodiment, its explanation will be omitted herein.

As described above, the exposure can also be executed by utilizing the charge injection transistor in a state that the connecting portion 3 and the potential barrier portion 7 are set to the same potential. A change of potential of the charge injection gate 17 can be suppressed smaller than a change of potential of the reset drain 6 explained in the first embodiment. Therefore, power consumption can be decreased in contrast to the imaging device in the first embodiment.

In the imaging device of the fourth embodiment, the noise can also be reduced by using the method of variably controlling the potential of the potential barrier portion 7 explained in the second embodiment in combination. That is, the exposure is started at a time T3[$i$] in FIG. 9, and the potential of the potential barrier portion 7 is set to the potential that is sufficiently lower than the potential in the exposure period at a time this exposure is ended. Then, the potential of the potential barrier portion 7 may be set to the same potential as that in the exposure period within a period from the end of the signal output to the discharge of the unnecessary charges at a time T2[$i$] (e.g., immediately before a time T0[$i$] in FIG. 9, or a time T1[$i$] or T2[$i$]).

In the explanation made up to now, the reset noise can be eliminated exactly by accumulating temporarily the charges generated in the exposure period in the first charge accumulating portion 4. However, when an accuracy in eliminating the reset noise is not requested, the driving system in the first to fourth embodiments can be employed even in the configuration in which the first charge accumulating portion 4 is not provided.

The solid state imaging element in this case may be constructed by replacing the transfer gate 8 with the reset gate 9, replacing the second charge accumulating portion 5 with the reset drain 6, and connecting the gate of the output transistor to the first charge accumulating portion 4, in the solid state imaging elements shown in FIG. 1 and FIG. 7. Here, in the case of such configuration, the p-type impurity layer 4$a$ formed on the surface of the first charge accumulating portion 4 should be deleted. In such configuration, the lag can be prevented by controlling variably the potential of the reset drain or providing the charge injection transistor, and thus the shooting of high picture quality can be achieved.

In this event, in order to aim at a higher sensitivity of the color solid state imaging element, the photoelectric converting layer 15 having the broad spectral characteristic is advantageous rather than the photoelectric converting layer that absorbs only the light in a particular wavelength range in photoelectric conversion. The reason for this is given as follows. That is, the photoelectric converting layer having the broad spectral characteristic employs the color filter in acquiring the color image to perform the color separation, and therefore the lights except the light that can pass through the color filter are absorbed by the color filter and are not utilized in the photoelectric conversion. In contrast, the photoelectric converting layer for absorbing only the light in the particular wavelength range (e.g., green light) in photoelectric conversion can pass other lights (blue light, red light), and therefore the transmitted lights can be utilized if the devising such as the lamination of photoelectric converting layers whose absorption light is different respectively, or the like, for example, is applied, so that improvement of a light utilization efficiency is advantageous in increasing a sensitivity. Therefore, for the purpose of attaining a higher sensitivity of the imaging element, it is desirable that the photoelectric converting layer 15 explained in the first to fourth embodiments should be formed of the organic material.

Also, a thickness of the photoelectric converting layer formed of the organic material is made thinner (about 300 nm) than that of the photoelectric converting layer formed of the inorganic material, and therefore a capacitance of the photoelectric converting layer is increased. That is, a capacitance accompanied with the connecting portion 3 is increased, and therefore a quantity of outflow charges $\Delta Q$ due to the thermal diffusion is also relatively increased (based on Q=CV). Therefore, the foregoing driving system shows a great advantage when the photoelectric converting layer formed of the organic material is employed.

Also, the driving method is explained by reference to a potential diagram up to now, by taking as an example the case where the signal output circuit is constructed by the n-MOS transistor circuits. But the signal output circuit may be constructed by using the p-MOS transistor circuits. In this case, the totally similar discussion can be applied except that the polarity becomes opposite to the n-MOS circuit, and therefore its explanation will be omitted herein. By the way, the signal reading circuit may be composed of the n-MOS transistors when the charge from the photoelectric converting layer 15 is the electron, and the signal reading circuit may be composed of the p-MOS transistors when the charge from the photoelectric converting layer 15 is the hole.

Also, in the above explanation, the electron is used as the handled charge. When the hole is used as the handled charge, the above potential diagrams employed in the above explanation may be viewed on the assumption that the potential is increased from the bottom to the top in the diagrams. That is, the magnitude of the potential may be read oppositely in the above explanation. Also, the n-type layers and the p-type layers may be reversed totally in the above explanation.

What is claimed is:

1. An imaging device, comprising:
   a solid state imaging element that has a plurality of pixels including: a semiconductor substrate; a pair of electrodes stacked above the semiconductor substrate; and a photoelectric converting layer arranged between the pair of electrodes; and
   a driving unit that drives the solid state imaging element;
   wherein each of the plurality of the pixels further includes:
      a connecting portion that is arranged in the semiconductor substrate and that is connected electrically to one of the pair of electrodes;
      a potential barrier portion that is arranged adjacent to the connecting portion in the semiconductor substrate and that acts as a potential barrier against a potential of the connecting portion;
      a first charge accumulating portion that is arranged adjacent to the potential barrier portion in the semiconductor substrate and in which charges generated in the photoelectric converting layer are accumulated via the connecting portion and the potential barrier portion; and
      a signal output circuit that outputs a signal in response to the charges accumulated in the first charge accumulating portion, and wherein the driving unit drives the solid state imaging element so that the connecting portion and the potential barrier portion are set to have a same potential by injecting charges into the connecting portion.

2. The imaging device according to claim 1, wherein the signal output circuit includes a reset transistor, and wherein, for applying the same potential between connecting portion and the potential barrier portion, the driving unit injects charges into the connecting portion by decreasing a potential of a drain of the reset transistor lower or increasing the potential of the drain of the reset transistor higher than a potential of the potential barrier portion, to restore the potential of the drain to a potential, and to discharge unnecessary charges generated by restoring to the drain.

3. The imaging device according to claim 1, wherein the pixel further includes a charge injection transistor having the connecting portion as a drain for injecting the charges to the connecting portion, wherein the signal output circuit includes a reset transistor, and wherein, for applying the same potential between connecting portion and the potential barrier portion, the driving unit injects charges into the connecting portion from the source by decreasing a potential of a source of the charge injection transistor lower or increasing the potential of the source of the charge injection transistor higher than a potential of a gate of the charge injection transistor, to restore the potential of the source to a potential after injection of the charges, and to discharge unnecessary charges generated by the injection to the drain of the reset transistor.

4. The imaging device according to claim 1, wherein the pixel further includes a charge injection transistor having the connecting portion as a drain for injecting the charges to the connecting portion, and wherein the signal output circuit includes a reset transistor, and wherein, for applying the same potential between connecting portion and the potential barrier portion, the driving unit injects charges into the connecting portion from the source by decreasing a potential of a gate of the charge injection transistor lower or increasing the potential of the gate of the charge injection transistor higher than a potential of a source of the charge injection transistor, to restore the potential of the gate to a potential after injection of the charges, and to discharge unnecessary charges generated by the injection to the drain of the reset transistor.

5. The imaging device according to claim 2, wherein the driving unit applies starts an exposure of the solid state imaging element in a state that the connecting portion and the potential barrier portion are set to the same potential, to decrease or increase a potential of the potential barrier portion lower or higher than a potential during the exposure as soon as the exposure is ended, and to restore the potential of the potential barrier portion to the potential during the exposure until the unnecessary charges are discharged in a driving after a signal obtained by the exposure is output.

6. The imaging device according to claim 1, wherein the pixel further includes a second charge accumulating portion that is arranged in the semiconductor substrate and that is connected to a gate of an output transistor constituting the signal output circuit, and a charge transferring unit that transfers the charges accumulated in the first charge accumulating portion to the second charge accumulating portion.

7. The imaging device according to claim 6, wherein the first charge accumulating portion is formed of an embedded type accumulating portion.

8. The imaging device according to claim 1, wherein the photoelectric converting layer is formed of an organic material.

9. A method of driving a solid state imaging element that has a plurality of pixels including:
a semiconductor substrate;
a pair of electrodes stacked above the semiconductor substrate;
a photoelectric converting layer arranged between the pair of electrodes;
a connecting portion that is arranged in the semiconductor substrate and that is connected electrically to one of the pair of electrodes;
a potential barrier portion that is arranged adjacent to the connecting portion in the semiconductor substrate and that acts as a potential barrier against a potential of the connecting portion;
a first charge accumulating portion that is arranged adjacent to the potential barrier portion in the semiconductor substrate and in which charges generated in the photoelectric converting layer are accumulated via the connecting portion and the potential barrier portion; and
a signal output circuit that outputs a signal in response to the charges accumulated in the first charge accumulating portion,
the method comprising;
driving the solid state imaging element so that the connecting portion and the potential barrier portion are set to a same potential by injecting charges into the connecting portion.

10. The method of driving the solid state imaging element according to claim 9, further comprising: for applying the same potential between connecting portion and the potential barrier portion,
injecting charges into the connecting portion by decreasing a potential of a drain of a reset transistor in the signal output circuit lower or increasing the potential of the drain of the reset transistor in the signal output circuit higher than a potential of the potential barrier portion,
restoring the potential of the drain to a potential; and discharging unnecessary charges generated by restoring to the drain.

11. The method of driving the solid state imaging element according to claim 9, wherein the pixel further including a charge injection transistor having the connecting portion as a drain for injecting the charges to the connecting portion,
the method further comprising: for applying the same potential between connecting portion and the potential barrier portion,
injecting charges into the connecting portion from the source by decreasing a potential of a source of the charge injection transistor lower or increasing a potential of the source of the charge injection transistor higher than a potential of a gate of the charge injection transistor,
restoring the potential of the source to a potential after injection of the charges; and
discharging unnecessary charges generated by the injection to the drain of a reset transistor in the signal output circuit.

12. The method of driving the solid state imaging element according to claim 9, wherein the pixel further including a charge injection transistor having the connecting portion as a drain for injecting the charges to the connecting portion, the method further comprising: for applying the same potential between connecting portion and the potential barrier portion,
injecting charges into the connecting portion from the source by decreasing a potential of a gate of the charge injection transistor lower or increasing the potential of the gate of the charge injection transistor higher than a potential of a source of the charge injection transistor,
restoring the potential of the gate to a potential after injection of the charges; and
discharging unnecessary charges generated by the injection to the drain of the reset transistor in the signal output circuit.

13. The method of driving the solid state imaging element according to claim 10, further comprising:
starting an exposure of the solid state imaging element in a state that the connecting portion and the potential barrier portion are set to the same potential;
decreasing a potential of the potential barrier portion lower or increasing the potential of the potential barrier portion lower higher than a potential during the exposure as soon as the exposure is ended; and
restoring the potential of the potential barrier portion to the potential during the exposure until the unnecessary charges are discharged in the driving after a signal obtained by the exposure is output.

14. The method of driving the solid state imaging element according to claim 9, wherein the pixel further includes a second charge accumulating portion that is arranged in the semiconductor substrate and that is connected to a gate of an output transistor constituting the signal output circuit, and a charge transferring unit that transfers the charges accumulated in the first charge accumulating portion to the second charge accumulating portion.

15. The method of driving the solid state imaging element according to claim 14, wherein the first charge accumulating portion is formed of an embedded type accumulating portion.

16. The method of driving the solid state imaging element according to claim 9, wherein the photoelectric converting layer is formed of an organic material.

* * * * *